(12) United States Patent
Soczka-Guth et al.

(10) Patent No.: US 6,914,084 B1
(45) Date of Patent: Jul. 5, 2005

(54) MEMBRANES CONTAINING SULFONATED POLYETHERKETONE AND ANOTHER POLYMER, METHOD FOR THE PRODUCTION AND USE THEREOF

(75) Inventors: Thomas Soczka-Guth, Schelklingen (DE); Christoph Padberg, Wiesbaden (DE); Georg Frank, Tübingen (DE)

(73) Assignee: Celanese Ventures GmbH (DE)

( * ) Notice: Subject to any disclaimer, the term of this patent is extended or adjusted under 35 U.S.C. 154(b) by 0 days.

(21) Appl. No.: 09/807,304

(22) PCT Filed: Sep. 18, 1999

(86) PCT No.: PCT/EP99/06929

§ 371 (c)(1),
(2), (4) Date: Nov. 27, 2001

(87) PCT Pub. No.: WO00/23177

PCT Pub. Date: Apr. 27, 2000

(30) Foreign Application Priority Data

Oct. 16, 1998 (DE) .......................................... 198 47 782

(51) Int. Cl.$^7$ ................................................ C08J 5/20
(52) U.S. Cl. ........................ 521/27; 521/33; 528/125; 528/373; 528/391
(58) Field of Search ................................ 528/125, 373, 528/391; 521/27, 33

(56) References Cited

U.S. PATENT DOCUMENTS

| | | | |
|---|---|---|---|
| 4,816,556 A | * | 3/1989 | Gay et al. .................... 528/176 |
| 5,049,340 A | * | 9/1991 | Moss et al. ................... 264/216 |
| 5,166,305 A | * | 11/1992 | Park et al. .................... 528/125 |
| 5,505,851 A | | 4/1996 | Wagener et al. ............. 210/490 |
| 5,561,202 A | | 10/1996 | Helmer-Metzmann et al. ... 525/471 |
| 5,741,408 A | | 4/1998 | Helmer-Metzmann et al. ... 204/252 |
| 5,834,566 A | | 11/1998 | Helmer-Metzmann et al. ... 525/535 |
| 5,853,911 A | | 12/1998 | Tetzlaff et al. ................ 429/41 |

FOREIGN PATENT DOCUMENTS

| | | |
|---|---|---|
| EP | 337 626 | 10/1989 |
| EP | 574 791 | 12/1993 |
| EP | 604 882 | 7/1994 |
| EP | 681 339 | 11/1995 |
| EP | 688 824 | 12/1995 |
| WO | 96/29360 | 9/1996 |

OTHER PUBLICATIONS

Litter et al., "Polyaromatic Ether–Ketones and Polyaromatic Ether–Ketone Sulfonamides from 4–Phenoxybenzoyle Chloride and from 4,4'–Dichlorofromyldiphenyl Ether" *Journal of Polymer Science, Polymer Chemistry Edition*, vol. 23:2205–2223 (1985).

* cited by examiner

Primary Examiner—Bernard Lipman
(74) Attorney, Agent, or Firm—Connolly Bove Lodge & Hutz LLP

(57) ABSTRACT

Membranes comprising sulfonated polyether ketone and another polymer, process for their production, and their use, Membranes comprising from 30 to 99.5% by weight of a sulfonated, strictly alternating polyether ketone (A) having repeat units of the formula (I) —Ar—O—Ar'—CO—, where Ar and Ar', independently of one another, are bivalent aromatic radicals, with an ion exchange capacity of from 1.3 to 4.0 meq of —SO$_3$H/g of polymer and from 0.5 to 70% by weight of a partially fluorinated, nonfluorinated or perfluorinated polymer (B) are described. The membranes may be used in fuel cells.

16 Claims, 3 Drawing Sheets

MEMBRANES CONTAINING SULFONATED POLYETHERKETONE AND ANOTHER POLYMER, METHOD FOR THE PRODUCTION AND USE THEREOF

Fuel cells are electrochemical energy converters which have in particular a high level of efficiency. Among the various types of fuel cells, polymer electrolyte fuel cells (PEM) have high power density and a low weight to power ratio.

One of the reasons for present difficulties in commercialization of fuel cell technology is the enormous cost of membrane materials widely used at present, such as Nafion®.

Proton-conducting membranes based on sulfonated polyether ketones for use in fuel cells are known and are also described in the literature. German Patent Application 197 54 305.7 describes the use of sulfonated PEEK (PEEK=polyether ether ketone) (Victrex PEEK®) with an ion-exchanger equivalent (IEC) of from 1.35 to 1.95 mmol of —$SO_3H$/g of polymer in fuel cells. The use of sulfonated PEEKK (Hostatec) is described in WO96/29359 and WO96/29360. EP-A-0 152 161 discloses polyether ketones composed predominantly of the repeat unit —O—Ar—CO—Ar—, and J. Polym. Sci., Vol. 23, 2205–2223, 1985 discloses sulfonated, strictly alternating polyether ketones with the repeat unit —O—Ar—CO—Ar. The structure of the polyether ketones here is a result of electrophilic attack, rather than nucleophilic attack as in EP 0152161.

The polymers are usually sulfonated with the aid of sulfur trioxide using triethyl phosphate in dichloroethane. Another sulfonation method used in the literature is chlorosulfonation with chlorosulfonic acid. However, with this method, depending on the degree of sulfonation, degradation of the molecular weight is also observed. Amidation of the acid chloride follows on. No mention is made of use in fuel cells or of property profiles which could suggest a use in fuel cells.

A polyether ketone which has been little studied hitherto is the strictly alternating polymer mentioned with the overall formula —O—Ar—CO—Ar—, which is produced, inter alia, by Victrex plc, U.K. The sulfonation of the polymer may be achieved, for example, by adding oleum to the solution of the polymer in sulfuric acid. However, the suitability of nonfluorinated aromatic polymers of this type for use in fuel cells has been disputed in the known literature on grounds of insufficient stability of the polymer membranes under the extreme conditions prevailing in fuel cells (A. Steck, Proc. $1^{st}$ Inter. Symp. on New Materials for Fuel Cell Systems, Montreal 1995, p. 74).

The glass transition temperature PEK (141° C., see EP 0 152 161 B1) differs only little from that of PEEK (143° C.), crystallinity 30%.

While membranes made from sulfonated PEEK with an IEC of at least 1.5 meq of —$SO_3H$/g of polymer (based on Victrex 450 PF) are stable for only about 2–3 h in boiling water, sulfonated polyether ketones based on Victrex PEK with a comparable IEC are, in contrast, stable in boiling water for more than 50 h. Notably, the electron-deficient structure of the polymer backbone of the polyether ketone, resulting from the absence of —O—Ar—O— units, appears particularly suitable for fuel cell applications.

Membranes made from highly sulfonated polymers are of particular interest for fuel cells with little or no humidification, and also for so-called super-caps, i.e. capacitors with extremely high capacitance.

It is known that the properties of polymeric materials can be changed by admixing other components. The difficulty is that it is difficult to predict the property profile of blends. There is no theory which reflects the complex nature of the polymer—polymer interactions (Macromolecules, Vol. 16, 1983, p. 753).

For example, EP-A-0688 824 mentions membranes made from homogeneous polymer alloys based on polyether ketones, polyether sulfones and a third, hydrophilic polymer.

The addition of the third hydrophilic polymer is needed here to achieve adequate humidification properties in the polymers.

The object of the present invention is to provide high-performance membranes with high proton conductivity made from low-cost materials and also having chemical and mechanical stability and moreover suitable in particular for use in fuel cells. The performance of the material in the fuel cell here should be superior to that of standard fluorinated materials used hitherto, such as Nafion.

Figure 1:
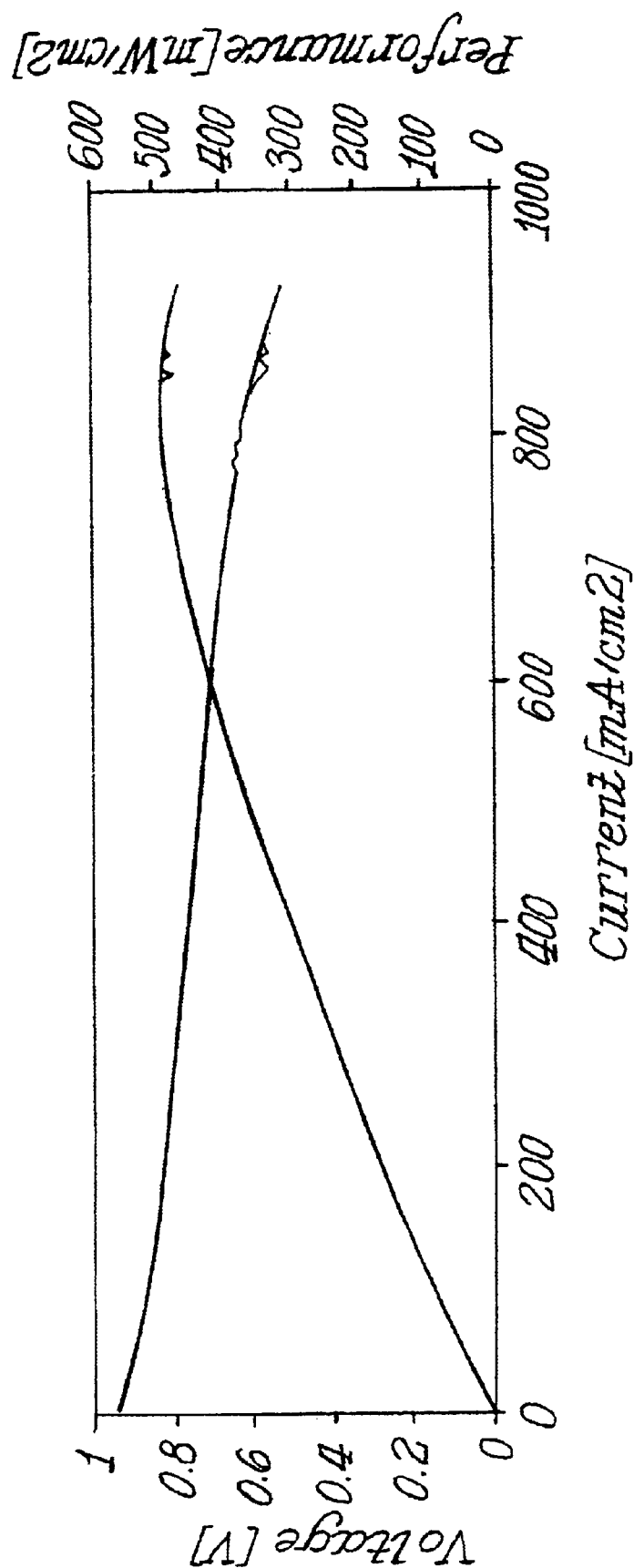
FIG. 1 illustrates the performance data for example 3.

The present invention achieves this object and provides membranes comprising from 30 to 99% by weight, preferably 55 to 99% by weight, of a sulfonated, strictly alternating polyether ketone (A) having repeat units of the formula (I)

—Ar—O—Ar'—CO—, where Ar and Ar', independently of one another, are bivalent aromatic radicals, Ar is preferably a phenylene radical with para bonds and/or meta bonds, and Ar' is preferably a phenylene, naphthylene, biphenylene or anthrylene radical with an ion-exchanger capacity of from 1.3 to 4.0 meq of —$SO_3H$/g of polymer and from 0.5 to 70% by weight, particularly from 1.0 to 50% by weight of a partially fluorinated, nonfluorinated or perfluorinated polymer (B) which is preferably soluble in organic solvents.

The ion-exchanger capacity (hereinafter "IEC") is determined by elemental analysis of the washed and dried polymers by determining the ratio of carbon to sulfur (C/S quotient).

For the purposes of this description, soluble polymers are polymers which at 25° C. have a solubility of at least 0.1 g per liter in organic solvents.

It is especially surprising that high proportions of the second polymer (B), e.g. of a polyether sulfone of the formula —Ar—O—Ar'—$SO_2$— or of a polyimide or of a derivative of these polymers, can be mixed with the sulfonated polyether ketones without impairing conductivity, since previous studies on sulfonated PEEKs with an IEC of 1.62 meq of —$SO_3H$/g of polymer have indicated that even additions of only a few percent of a polyether sulfone, e.g. Ultrason, gave a dramatic fall-off in conductivity.

The polymers used according to the invention preferably comprise aromatic radicals which may, if desired, carry substituents, such as alkyl, cycloalkyl, aryl or halogen.

Adding as little as 5% of a polyether sulfone (PES) causes a fall-off in conductivity of from 80 to about 70 mS/cm. The novel membranes made from sulfonated polyether ketones and polyether sulfones, in contrast, retain, or even slightly increase, their conductivity up to 40% addition of PES. The conductivity values found for the blends are markedly higher than those found for the sulfonated PEEKs.

This implies a considerable commercial advantage, since relatively large amounts of cost-effective polyether sulfone can be admixed without loss of proton conductivity. In addition, the modulus of elasticity in water at 60° C. is markedly improved (see examples) and this favorably affects strength when exposed to pressure differentials and at the edges of the membrane, where the humidified gases can penetrate without hindrance and without mechanical support of the membrane from the electrode. For example, the modulus of elasticity at 60° C. in water increases to 540 MPa, compared with 7 MPa for the pure material, at conductivity values which remain very good. As shown in the examples, the performance of the fuel cell with these membrane materials is also good.

The modulus of elasticity in the dry state for the novel membranes at 23° C. and 50% relative humidity is ≧600 MPa, in particular in the range from 600 to 3000 MPa, with an ultimate elongation in the range from 5 to 300%, preferably from 30 to 200%. Although the modulus of elasticity values here are lower than those of conventional polyether ketones, e.g. Victrex and Hostatec®, the ultimate elongation achieved is on the other hand significantly improved, and this is a decisive factor for good stability and the use of the membrane in fuel cells. The novel membranes have an ultimate elongation of ≧200%, in particular from 200 to 800%, with a modulus of elasticity (determined as the gradient of the tangent at 1.2 MPa) in water at 60° C. of at least 90 MPa, in particular from 100 to 700 MPa.

The novel membranes therefore have excellent suitability for use in fuel cells, in particular in direct methanol fuel cells, or else in high-performance capacitors, and also for use in electrodialysis. For electrodialysis the membrane preferably has a thickness of at least 30 µm.

When the novel membranes are used in fuel cells a preferred content of polymer (B) is from 5 to 25% by weight, or from 5 to 50% by weight for use in direct methanol fuel cells.

When using the novel membrane in hydrogen-air fuel cells, therefore, with 2.0 bar gauge gas pressure and 7.1 l/h of hydrogen flow and 30.1 l/h of oxygen flow, using electrodes as in WO 97/20358 and with 0.35 mg/cm of platinum on each side, the current densities achieved are at least 450 mA/cm at 700 mV.

To produce the membranes of the present invention the sulfonated polyether ketone (A) is dissolved with the polymer (B) in a weight ratio in the range from 0.01 to 0.5 (B/A) in a solvent, e.g. N-methylpyrrolidone (NMP) or dimethylformamide (DMF), dimethylacetamide (DMAc), dimethyl sulfoxide (DMSO), or in solvent mixtures comprising water and 1,4-dioxane and acetonitrile. The temperature should preferably not exceed 90° C. The solution is then filtered at a temperature in the range from 20 to <90° C., through a deep-bed PP (polypropylene) filter and then dried and degassed.

With the aid of a stainless steel doctor, the solution is spread on a sheet-like support, for example a glass plate, and dried at from 25 to 140° C. in a circulating-air drying cabinet overnight. The membrane is preferably dried in such a way as to give a residual solvent content below 0.5% by weight.

After producing the membrane it is advisable to free it from residual solvent and from other water-soluble impurities by washing in water or in a dilute acid (nitric acid, sulfuric acid or phosphoric acid) using a concentration of from 0.1 to 20%.

In a particular embodiment of the invention, the solution of the blend may be introduced into an absorbent web. The proton conductivity of the resultant composite in this case, in contact with water at room temperature, is above 50 mS/cm.

EXAMPLES

Example 1

Sulfonation of PEK 3.49 kg of 98% strength sulfuric acid are charged to a double-walled reaction vessel which can be heated. 400 g of Victrex PEK are introduced into the solution as rapidly as possible, with stirring using a toothed disk. The temperature is increased to 50° C. As soon as a clear red solution has been obtained, 2.40 kg of oleum (20% of free $SO_3$) are added. As soon as the desired degree of sulfonation has been achieved (after about 1 or 2 hours for an IEC of 2.12 meq of —$SO_3H$/g of polymer) the solution is cooled to 20° C. and the polymer is precipitated in distilled water.

The polymer is filtered off with suction, washed until neutral (test using $BaCl_2$ solution) and dried at from 60 to 120° C. in a circulating-air drying cabinet.

Example 2

Preparation of the Blends Taking the Example of the Membrane Used in Example 3

The solutions are charged, under a flow of nitrogen, to a double-walled vessel which can be heated. 8.5 g of dry Ultrason® 7020 P polyether sulfone and 52.7 g of dry sulfonated polyether ketone PEK with an IEC of 2.12 meq of —$SO_3H$/g of polymer are introduced into 332 g of dry NMP in this vessel and dissolved using a Dissolver. The temperature of the solution here should not exceed 90° C. The solution is filtered at 80° C. through a deep-bed PP filter (5 µm) and degassed for 10 min in a vacuum drying cabinet at 50° C. and 100 mbar.

With the aid of a stainless doctor (200 µm) the solution is spread on a glass plate and dried at from 30 to 120° C. in a circulating-air drying cabinet overnight.

Example 3

Performance Data

Performance of a blend made from PEK with an IEC of 2.12 meq of $SO_3H$/g of polymer and 12.5% by weight of Ultrason PES. Thickness 40 µm. Electrode as in WO 97/20358 with 0.35 mg/cm$^2$ of platinum on each side.

| | | |
|---|---|---|
| Cell temperature [° C.]: | RT | |
| Gas temp. H$_2$/air [° C.]: | 89/95 | |
| Humidification: | H$_2$/air | |
| | H$_2$ | Air |
| Gauge pressure [bar$_g$]: | 2.0 | 2.0 |
| Flow rate [l/h]: | 7.1 | 30.1 |
| Maximum performance [mW/cm$^2$]: | 500 | |
| U at max. P [mV]: | 617 | |
| I at 700 mV [mA/cm$^2$]: | 605 | |
| I at 600 mV [mA/cm$^2$]: | 736 | |
| Area [cm$^2$]: | 12.6 | |

See FIG. 1 for the performance data.

Example 4

Proton Conductivity

Values for the proton conductivity of PEK/PES blends (PEK with an IEC of 2.12 meq of —$SO_3H$/g of polymer. The proton conductivity is measured using a 4-pole arrangement. The electrode material used is platinum. During the measurement temperature-controlled water flows over the membrane. The thickness and width of the membrane are determined in the dry state, after the treatment with 5% strength nitric acid at 40° C. The measurement equipment used is a Zahner IM 5d adapted for a 4-pole measurement arrangement.

Figure 2:
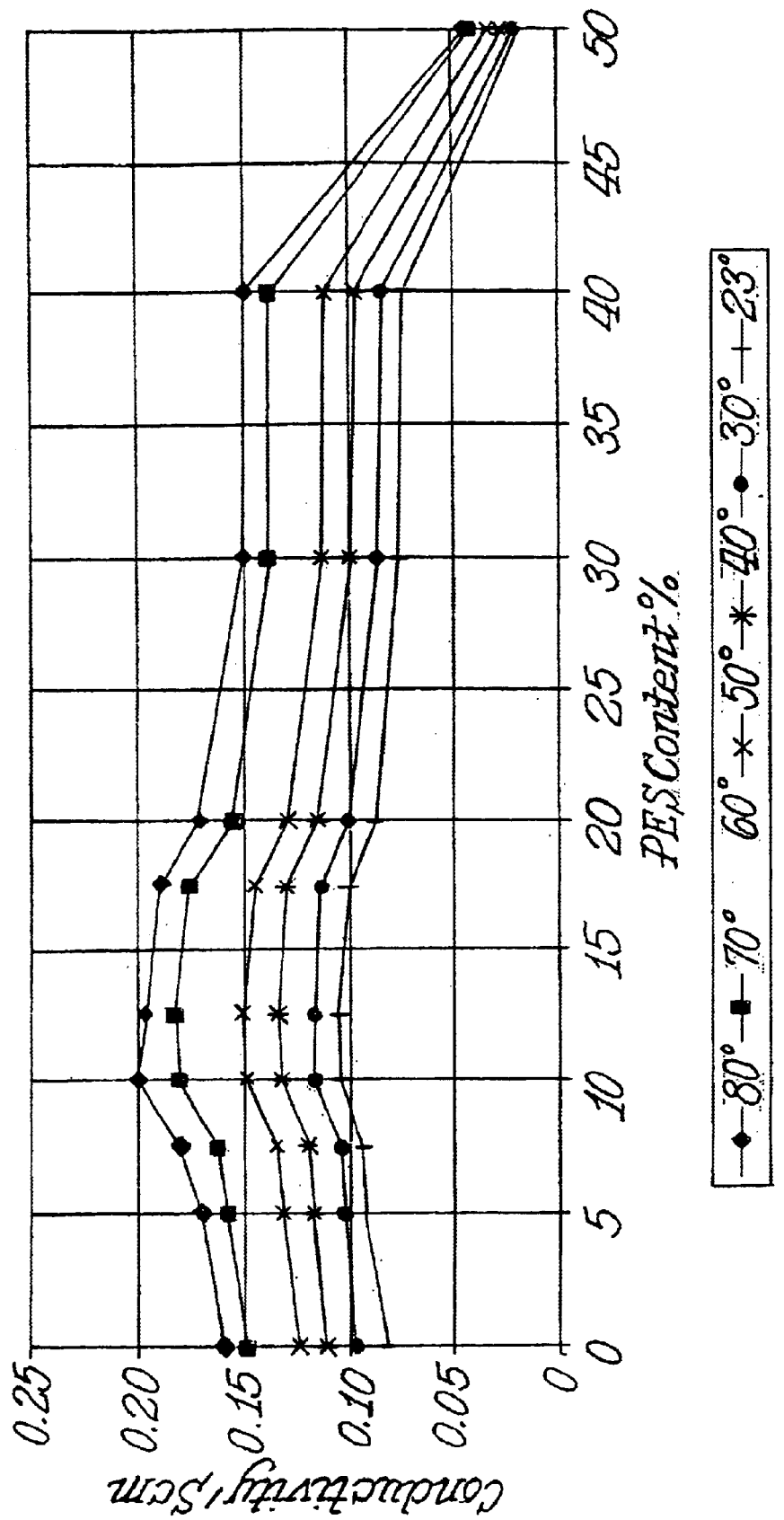
FIG. 2 illustrates the conductivity of PEK (IEC 2.12) as a function of PES content. The values are measured with declining temperature.

See FIG. 2 for the conductivity data.

2. Conductivity values (declining temperature) measured at from 80 to 23° C.

| PES content % | Conductivity S/cm 80° | Conductivity S/cm 70° | Conductivity S/cm 60° | Conductivity S/cm 50° | Conductivity S/cm 40° | Conductivity S/cm 30° C. | Conductivity S/cm 23° |
|---|---|---|---|---|---|---|---|
| 0 | 0.1598 | 0.1482 | 0.1365 | 0.1235 | 0.1100 | 0.0961 | 0.0805 |
| 5 | 0.1696 | 0.1571 | 0.1444 | 0.1307 | 0.1161 | 0.1018 | 0.0909 |
| 7.5 | 0.1800 | 0.1618 | 0.1481 | 0.1339 | 0.1188 | 0.1038 | 0.0925 |
| 10 | 0.1998 | 0.1793 | 0.1639 | 0.1482 | 0.1322 | 0.1161 | 0.1036 |
| 12.5 | 0.1963 | 0.1813 | 0.1642 | 0.1499 | 0.1332 | 0.1161 | 0.1050 |
| 17.5 | 0.1890 | 0.1751 | 0.1600 | 0.1452 | 0.1293 | 0.1129 | 0.0998 |
| 20 | 0.1707 | 0.1552 | 0.1422 | 0.1283 | 0.1143 | 0.1008 | 0.0875 |
| 30 | 0.1505 | 0.1388 | 0.1250 | 0.1125 | 0.0986 | 0.0860 | 0.0770 |
| 40 | 0.1492 | 0.1374 | 0.1248 | 0.1117 | 0.0975 | 0.0847 | 0.0744 |
| 50 | 0.0461 | 0.0418 | 0.0366 | 0.0321 | 0.0275 | 0.0234 | 0.0202 |
| 60 | 0.0347 | 0.0314 | 0.0281 | 0.0252 | 0.0217 | 0.0183 | 0.0162 |
| 70 | 0.0178 | 0.0162 | 0.0142 | 0.0129 | 0.0111 | 0.0093 | 0.0083 |

Example 5

Mechanical data

| IEC of PEK | Content of PES [%] | Modulus of elasticity, 23° C., and 50% rel. humidity [MPA] | Ultimate elongation [%] | Modulus of elasticity, 60° C., in water* [MPa] | Ultimate elongation [%] |
|---|---|---|---|---|---|
| 2.12 | 0 | 695 | 121 | 7 | 200 |
| 2.12 | 5 | 1140 | 72 | 536 | 284 |
| 2.12 | 7.5 | 725 | 30 | 158 | 288 |
| 2.12 | 10 | 646 | 28 | 195 | 300 |
| 2.12 | 12.5 | 1445 | 111 | 124 | 370 |
| 2.12 | 17.5 | 636 | 26 | 110 | 231 |
| 2.12 | 20 | 1058 | 40 | 100 | 235 |

Figure 3:
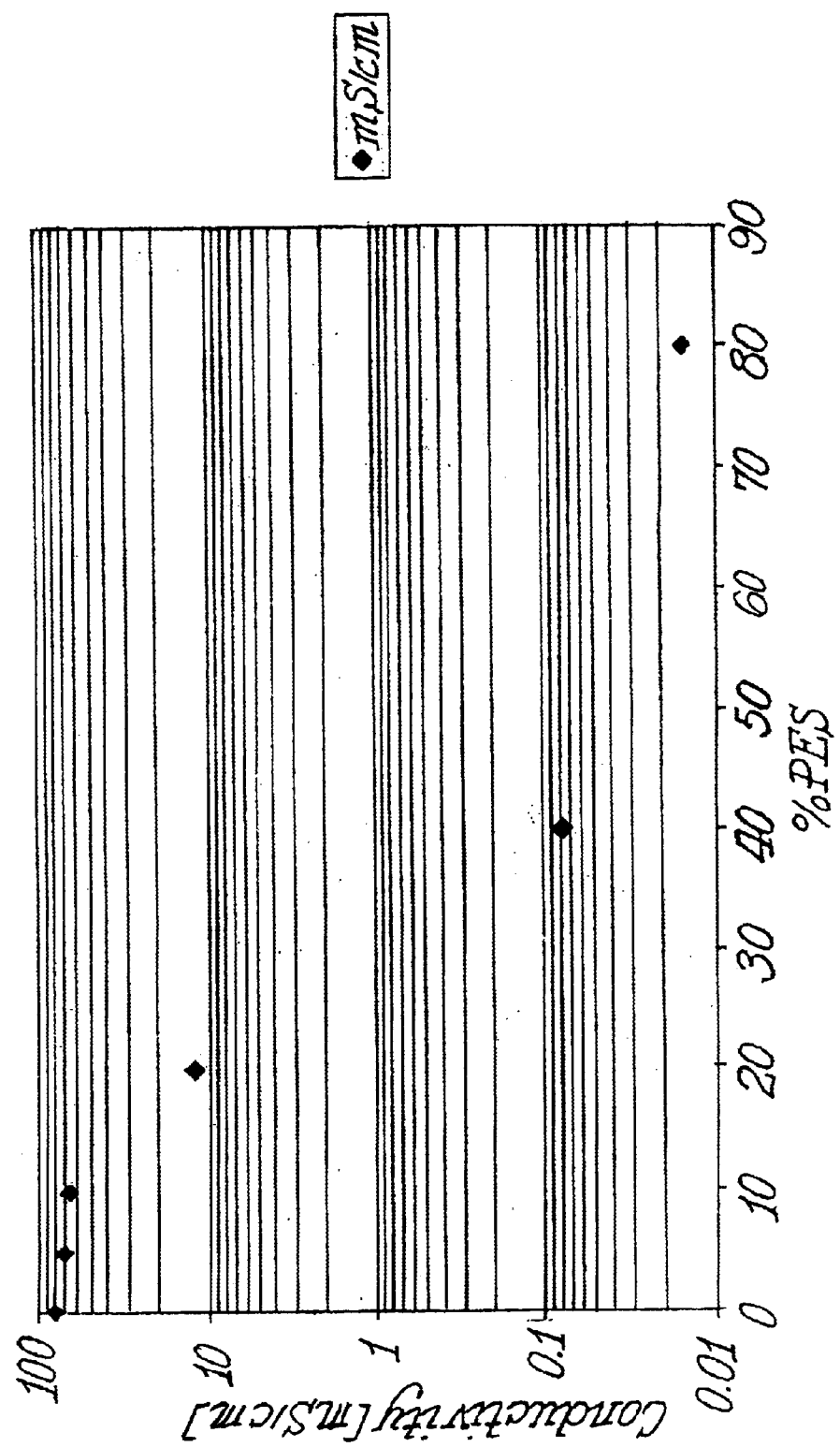
FIG. 3 illustrates the conductivity data for example 6.

*measured in water, modulus of elasticity in water determined as gradient of tangent at 1.2 MPa See FIG. 3 for the conductivity data.

Conductivity values for blends of sulfonated PEEK (IEC 1.62) and PES Ultrason 7020P.

Example 7

Comparative mechanical data

| Polymer | IEC | Modulus of elasticity, 23° C., and 50% rel. humidity [MPa] | Ultimate elongation [%] | Modulus of elasticity, 23° C., wet* [MPa] | Ultimate elongation [%] |
|---|---|---|---|---|---|
| Victrex PEEK 450 PF | 1.62 | 1725 | 10 | 324 | 90 |
| Hostatec PEEKK | 1.46 | 1590 | 36 | 140 | 52 |

*Films tested wet after 2 hours in water

What is claimed is:

1. A membrane comprising a blend comprising from 30 to 99.5% by weight of a sulfonated, strictly alternating polyether ketone (A) having repeat units of the formula (I)—Ar—O—Ar'—CO—, where Ar and Ar', independently of one another, are bivalent aromatic radicals, with an ion-exchange capacity of from 1.3 to 4.0 meq of —$SO_3H$/g of polymer and from 0.5 to 70% by weight of a partially fluorinated, nonfluorinated or perfluorinated polymer (B) which is a polyether sulfone of the formula —Ar—O—Ar'—$SO_2$—, where Ar and Ar' are as defined above.

2. A membrane as claimed in claim 1, where Ar is a phenylene radical having para bonds and/or meta bonds and Ar' is a phenylene, naphthylene, biphenylene or anthrylene radical.

3. The membrane as claimed in claim 1, wherein the partially fluorinated, nonfluorinated or perfluorinated polymer (B) is a polymer soluble in organic solvents.

4. The membrane as claimed in claim 1, wherein the membrane has mechanical properties which remain almost unchanged even after boiling in water for at least 50 hours.

5. A membrane as claimed in claim 1, wherein the modulus of elasticity in the dry state at 23° C. and 50% relative humidity is $\geq$600 MPa.

6. A membrane as claimed in claim 1, wherein the modulus of elasticity (determined as gradient of the tangent at 1.2 MPa) in water at 60° C. is at least 90 MPa and the ultimate elongation is $\geq$200%.

7. A process for producing (a) the membrane as claimed in claim 1, which comprises reacting a sulfonated polyether ketone (A) with a polymer (B) in a weight ratio in the range from 0.01 to 0.5 (B/A) in a solvent, filtering off, spreading the solution on a sheet-like support and then drying at a temperature of from 25 to 140° C.

8. A fuel cell which comprises the membrane the claimed in claim 1.

9. The fuel cell as claimed in claim 8, wherein the fuel cell is a direct methanol fuel cell.

10. A high performance capacitor which comprises the membrane as claimed in claim 1.

11. The membrane as claimed in claim 1, wherein the membrane has a thickness of at least 30 $\mu$m.

12. The fuel cell as claimed in claim 9, wherein polymer (B) is present in an amount from 5 to 50% wt.

13. The membrane as claimed in claim 1, wherein the modulus of elasticity in the dry state at 23° C. is from 600 to 3,000 MPa with an ultimate elongation in a range from 30 to 200%.

14. The membrane as claimed in claim 6, wherein the ultimate elongation is from 200 to 800% and has a modulus of elasticity from 100 to 700 MPa.

15. The membrane as claimed in claim 1, wherein polymer (B) is present in an amount up to 40% by weight.

16. The membrane as claimed in claim 1, wherein polymer (B) is present in an amount up to 20% by weight.

* * * * *